United States Patent [19]

Dyke et al.

[11] Patent Number: 5,155,403
[45] Date of Patent: Oct. 13, 1992

[54] COIL WINDING ARMATURES AND ARRANGEMENT OF PARALLEL COILS

[75] Inventors: Colin Dyke, North Augusta; Carl Gifford, Chatam, both of Canada

[73] Assignee: Black & Decker, Inc., Newark, Del.

[21] Appl. No.: 705,496

[22] Filed: May 24, 1991

Related U.S. Application Data

[62] Division of Ser. No. 528,970, May 24, 1990, Pat. No. 5,044,065.

[51] Int. Cl.[5] .............. H02K 3/12; H02K 17/22; H02K 23/26; H02K 1/26
[52] U.S. Cl. .............. 310/208; 310/234; 310/264
[58] Field of Search .......... 310/40 MM, 206, 208, 310/234, 233, 264, 158, 184, 179, 198, 210, 204, 71, 215

[56] References Cited

U.S. PATENT DOCUMENTS

| | | | |
|---|---|---|---|
| 2,476,795 | 7/1949 | Avigdor | 310/234 |
| 2,743,386 | 4/1956 | Diehl | 310/234 |
| 2,826,707 | 3/1958 | Camprubi | 310/234 |
| 2,878,405 | 3/1959 | Merril | 310/234 |
| 3,020,429 | 2/1962 | Courneya | 310/234 |
| 3,601,642 | 8/1971 | Willyoung | 310/198 |
| 3,783,501 | 1/1974 | Biddison et al. | 310/234 |
| 3,818,257 | 6/1974 | Porter et al. | 310/179 |
| 3,921,284 | 11/1975 | Bucholtz et al. | 310/234 |
| 4,027,827 | 6/1977 | Biddison | 310/234 |
| 4,163,931 | 8/1979 | Seitz et al. | 310/234 |
| 4,219,753 | 8/1980 | Heyraud | 310/234 |
| 4,417,388 | 11/1983 | Major | 29/598 |
| 4,559,464 | 12/1985 | Stokes | 310/233 |
| 4,633,577 | 1/1987 | Banner | 310/234 |
| 4,707,629 | 11/1987 | Wasko | 310/129 |
| 4,792,714 | 12/1988 | Schlieter | 310/234 |
| 4,857,790 | 8/1989 | Kamiyama et al. | 310/234 |
| 4,948,998 | 8/1990 | Fink et al. | 310/127 |
| 5,044,065 | 9/1991 | Dyke et al. | 29/597 |

FOREIGN PATENT DOCUMENTS

| | | |
|---|---|---|
| 70916 | 4/1901 | Canada . |
| 0415493 | 3/1991 | European Pat. Off. . |
| 322912 | 2/1903 | France . |
| 58-22559 | 2/1983 | Japan . |
| 60-229651 | 11/1985 | Japan . |
| 549302 | 5/1974 | Switzerland . |

Primary Examiner—Steven L. Stephan
Assistant Examiner—D. R. Haszko
Attorney, Agent, or Firm—Charles E. Yocum; Dennis A. Dearing; Edward D. C. Bartlett

[57] ABSTRACT

A method of winding a motor armature includes providing a sub-assembly comprising a shaft having an armature core and a commutator mounted thereon, the commutator having commutator bars spaced apart about the shaft with each bar having leading and trailing wire connection devices angularly spaced apart with respect to said shaft. A first wire is connected to a leading wire connection device and a second wire is connected to a leading connection device on the other side of the commutator. The successive coils are separately wound on the armature core from the first and second wires with connection of each wire to a different leading connection device between successive coils. Thereafter further successive coils are separately wound on the core from the wires but now with connection of the wires between successive coils to trailing connection devices until the commutator bars have pairs of electrically parallel coils connected thereto. Armatures can be produced having parallel coils of 17 gauge copper wire by continuous winding with end termination only occurring after completion of winding.

17 Claims, 4 Drawing Sheets

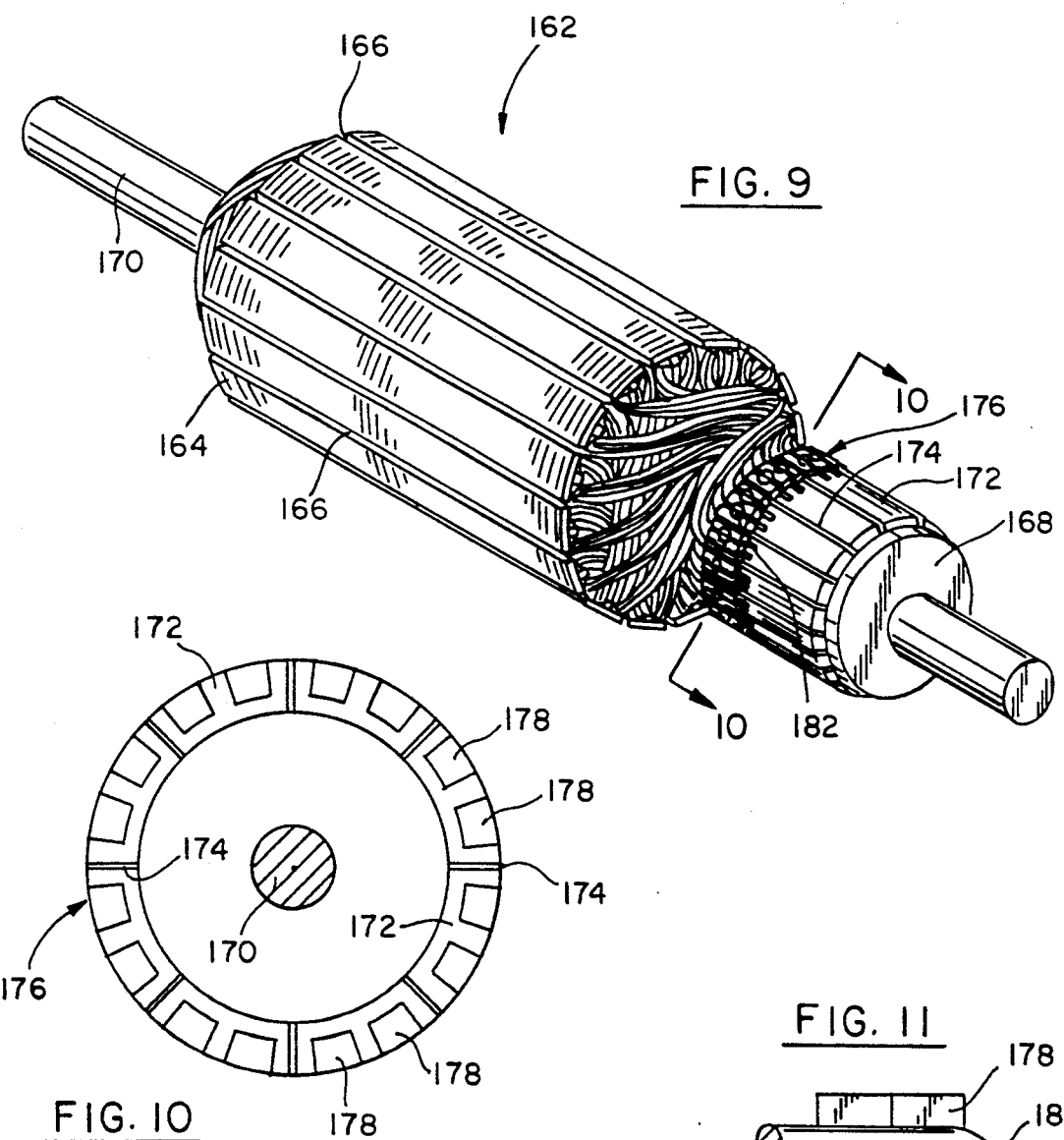
FIG. 9
FIG. 10
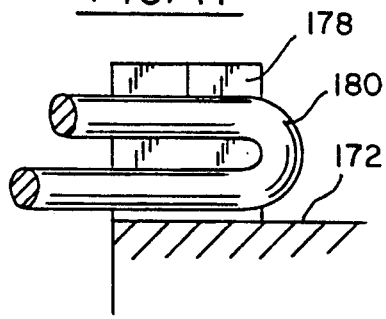
FIG. 11

COIL WINDING ARMATURES AND ARRANGEMENT OF PARALLEL COILS

This application is a division, of application Ser. No. 528,970, filed May 24, 1990 now U.S. Pat. No. 5,044,065.

FIELD OF THE INVENTION

The invention relates to armatures of electric motors and methods of coil winding such armatures. The invention is particularly directed to arranging parallel coils in the armatures.

BACKGROUND OF THE INVENTION

Various machines and methods for automatically winding coils on electric motor armatures are well known and have been in use for many years. It is quite usual to simultaneously wind coils from two separate wires on diametrically opposite sides with respect to the axis of the armature.

To obtain higher power from an electric motor, it may be desirable at times to wind the armature coils from heavy gauge wire, for example 14 gauge copper wire. However, due to the stiffness of such heavy gauge wire, it has not been found possible to automatically wind small dimensioned armatures with such wire.

SUMMARY OF THE INVENTION

It has been realized that there is a need for smaller dimensioned electric motors with considerable power, particularly for higher powered cordless devices and appliances, for example to provide a cordless grass mower powered by a 12 volt battery.

An object of the present invention is to be able to use more readily windable wire by having parallel coils in the motor's armature.

It is a particular object of the preferred embodiments of the invention to provide an armature with pairs of parallel coils which can be wound in one continuous coil winding operation without interruption for intermediate end termination.

A feature by which the above objects can be obtained is providing each commutator bar of a commutator with two side-by-side wire connecting devices and separately connecting therewith two parallel coils to each commutator bar. Another feature is changing the sequence of connection to the side-by-side wire connecting devices part way through the formation of the coils.

A preferred feature is to provide two parallel slots in each commutator bar as the wire connecting devices.

Another preferred feature of the invention is to locate the coils of each pair of parallel coils one on top of each other in the same armature core cavities.

Accordingly, therefore, there is provided by one aspect of the present invention a method of winding an armature of an electric motor including first producing a subassembly comprising an armature core and a commutator mounted on a shaft, and with the commutator having a plurality of bars each having a pair of wire securing devices. Then winding pairs of electrically parallel coils on the core and connecting each pair of parallel coils between a respective pair of commutator bars, and attaching separately the two coils of each pair of coils to each of the two bars of the respective pair of bars by separate ones of the wire securing devices of each of the two bars of the respective pair of bars.

According to another aspect of the invention, there is provided a method of winding an armature of an electric motor starting by providing a sub-assembly comprising a shaft having an armature core and a commutator mounted thereon, the commutator having a plurality of bars angularly spaced apart about the shaft with each bar having first and second wire connection devices angularly spaced apart with respect to the shaft. Then connecting a first wire to one of the first wire connection devices and connecting a second wire to a different one of the first wire connection devices. Thereafter winding separately successive coils on the armature core from the first and second wires with connection of the wires to the first wire connection devices between successive coils. Then winding separately further successive coils on the armature core from the first and second wires but now with connection of the wires between successive coils to the second wire connection devices, and continuing the winding until the commutator bars have pairs of electrically parallel coils connected thereto.

According to yet a further aspect of the invention, there is provided a method of making an armature of an electric motor, comprising forming a commutator having a plurality of commutator bars spaced-apart about an axis, and forming a pair of axial slots in each commutator bar before or after the assembly of the armature ready for coil winding. Assembling the commutator, an armature core, and an armature shaft, the core having axial coil cavities. Then simultaneously winding coils through different coil cavities in the core from two wires and continuing this winding until all the coil cavities have coils therethrough, the wires being pressed into the slots between successively wound coils but only one of each pair of slots being so occupied. Thereafter, proceeding to wind a second set of coils from the wires until all the coil cavities have coils of the second set therethrough, the wires being pressed into the other of each pair of slots between successively wound coils of the second set.

Preferably the armature is rotationally indexed about a central axis of the shaft between the winding of successive coils, each pair of bar slots comprising a leading slot and a trailing slot in a direction in which the armature is rotationally indexed, and the two wires being pressed into leading slots while the armature is rotationally indexed through a first 180 degrees but being pressed into trailing slots during the next 180 degrees of rotational indexing.

According to yet another aspect of the invention, there is provided an armature having an armature core and a commutator supported on a shaft, the core having an inner set of coils wound therein and an outer set of coils wound on top of this inner set. Half of the inner set and half of the outer set of coils are formed from a first continuous wire, while the remaining half of the inner set and the remaining half of the outer set are formed from a second continuous wire. The commutator has a plurality of commutator bars each having a pair of wire connecting devices, and the first and second wires are connected to the bars between coils of the inner set by only one of the wire connecting devices of each such pair of devices, with the wires being connected to the bars between coils of the outer set by only the other of the wire connecting devices of each such pair of devices.

As will be clearly understood from the following description, when winding from two wires each wire can advantageously be changed over from connection to the commutator bars by leading (or righthand) slots to trailing (or lefthand) slots after one complete set of coil windings have been completed, preferably when all the bottom windings have been made. This shift in wire end placement in relation to armature indexing (for winding successive coils), enables top and bottom parallel coils to be wound in a continuous operation without any special end termination before changing over to winding the top coils.

Other objects, features and advantages of the present invention will become more fully apparent from the following detailed description of the preferred embodiments, the appended claims and the accompanying drawings.

BRIEF DESCRIPTION OF THE DRAWINGS

In the accompanying drawings, in which like reference characters in the same or different Figures indicate like parts:

FIG. 9 is a perspective view of a universal motor armature according to the invention;

FIG. 10 is a section on the line 10—10 in FIG. 9 but of the embodiment of FIG. 7 and with some parts omitted for clarity; and FIG. 11 is a representation in a radial plane through the axis of rotation of the armatures of FIGS. 9 and 10 of the looping of a continuous coil wire in a termination slot of one of the bars of the commutator.

DETAILED DESCRIPTION OF THE PREFERRED EMBODIMENTS

FIGS. 1 to 4 represent coil winding of an electric motor armature as practiced at present in the prior art, particularly with fractional horse power permanent magnet or universal motors. These Figs. illustrate a multi-coil armature 20 having coils 22, 24, 26, 28 etc. wound from a single wire 30 with each coil being connected between adjacent bars A1, A2, A3, A4, A5 etc. of a commutator of the armature.

Figure 1:
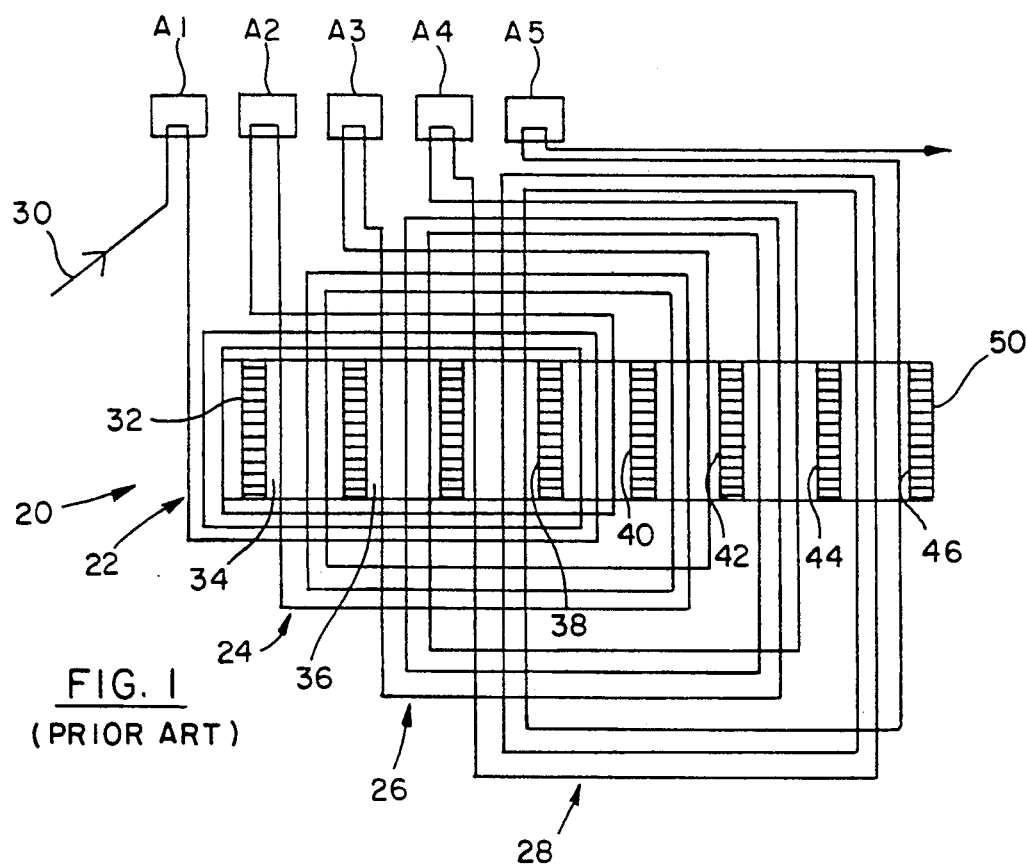
FIG. 1 schematically illustrates the continuous winding of series connected coils of an electric motor armature according to the prior art.

FIG. 1 shows the wire 30 first connected to commutator bar A1, then wound through spaced apart slots 32, 40 of a laminated iron core 50. The wire 30 then is connected to the next adjacent commutator bar A2 and next wound through the next spaced apart pair of core slots 34, 42 till connected to the next bar A3 to form the coil 24. Coils 26, 28 etc. are similarly wound and connected between pairs of successive commutator bars A3, A4; A4, A5; etc.

Figure 2:
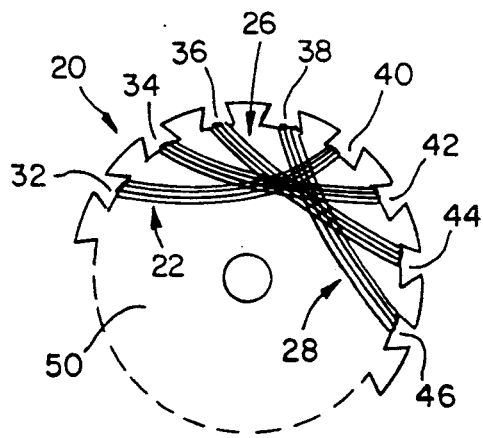
FIG. 2 diagrammatically illustrates an end view of the armature and coil windings of FIG. 1.

FIG. 2 shows more realistically the coils 22, 24, 26 and 28 wound in the longitudinally extending slots in the circumference of the armature laminated core 50. typically, there may be sixteen or thirty-two slots 32, 34 etc.

Figure 3:
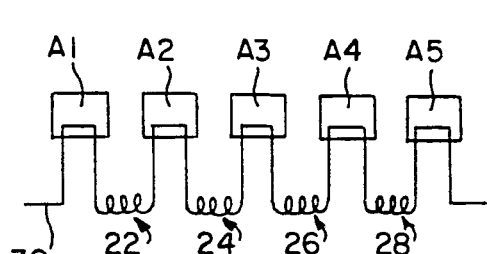
FIG. 3 is a simplified illustration of the coil windings of FIGS. 1 and 2.

FIG. 3 illustrates the single wire forming the coils 22, 24, 26, 28 etc. which are connected in series between the commutator bars A1, A2, A3, A4, A5 etc. The ends of the wire are connected together at a commutator bar, the bar at which the winding starts. Opposite pairs of coils may be simultaneously wound with half the coils being formed from one continuous wire and the other half of the coils being wound from another continuous wire.

Figure 4:
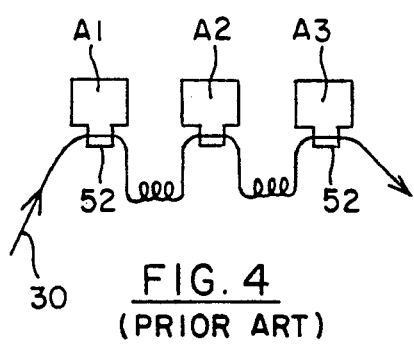
FIG. 4 illustrates a prior art manner of connecting the coils of FIGS. 1, 2 and 3 to the commutator bars.

FIG. 4 illustrates one way of connecting the coil wire 30 to the commutator bars A1, A2 etc. using tangs 52 extending from each commutator bar and bendable over the wire 30 to capture the wire against the respective bar.

Machinery for winding armature coils as in FIGS. 1 to 4 is well known and does not require specific description. For example, various aspects of such armature winding machinery are disclosed in U.S. Pat. Nos. 3,783,501; 3,921,284; 4,027,827; 4,163,931; and 4,633,577; the disclosures in these five patents are hereby incorporated herein by reference. U.S. Pat. No. 3,783,501 discloses a double flier automatic armature Winding machine with wire cutting mechanism for terminating windings. U.S. Pat. No. 3,921,284 also discloses a double flier winder which has wire end breaking arrangements. U.S. Pat. No. 4,027,827 discloses a twin flier armature winder with wire shields and wire clamps. U.S. Pat. No. 4,163,931 discloses an example of an electronic control system and circuitry for automatic coil winding of armatures. U.S. Pat. No. 4,633,577 discloses a further double flier armature winder with wire trimming assemblies.

The preferred embodiment of the invention is illustrated in FIGS. 9 to 11 with simplified embodiments thereof being illustrated in FIGS. 5 to 8. The embodiments of FIGS. 5 to 8 have been simplified, particularly as to the number of coils and commutator bars, to facilitate understanding of the invention in relation to the method of continuous winding of parallel coils and of the manner and sequence of connecting these to the commutator.

Figure 5:
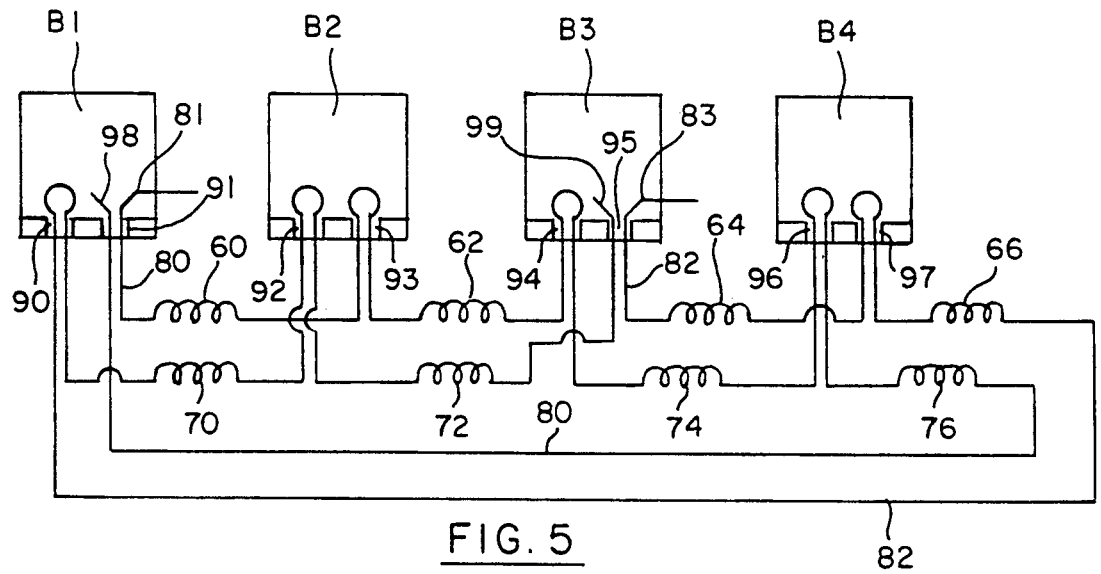
FIG. 5 is an illustration along the lines of FIG. 3 but showing the coil winding of the present invention applied to a simplified armature having a four bar commutator.

FIG. 5 illustrates in simplified manner an electric motor armature having a commutator with four symmetrically disposed commutator bars B1, B2, B3, B4 having wound therebetween four pairs of parallel armature coils 60, 70; 62, 72; 64, 74; 66, 76 wound from two wires 80, 82. Each commutator bar has two spaced apart wire termination slots radially cut in an outwardly extending radial flange at the end of the commutator facing the armature core (see also FIG. 9). The four bars B1 to B4 have respectively four pairs of parallel of lefthand and righthand slots 90, 91; 92, 93; 94, 95; and 96, 97. Using a double flier armature winding machine, starting ends 81, 83 of the two wires 80, 82 are held in righthand slots 91, 95, respectively, and coils 60, 64 simultaneously would in different pairs of coil slots in the armature core; the wires 80, 82 are then located in righthand slots 93, 97 of the next respective adjacent commutator bars B2, B4. These wires are bent back on themselves and stuffed into the same slots 93, 97 to form loop connections in the slots 93, 97. The armature is then rotatably indexed one core slot and the two coils 62, 66 simultaneously wound from the respective wires 80, 82. The wires 80, 82 are then connected to the opposite starting commutator bars B3, B1, respectively, and this would complete a first full winding of the armature. However, due to the pairs of slots in each commutator bar, the wires 80, 82 are not placed in the righthand opposite starting slots 95, 91 but are respectively placed now in the adjacent lefthand slots 94, 90 and looped connections stuffed in these slots as illustrated. Next, coils 74, 70 are simultaneously wound from the wires 80, 82 with these new coils 74, 70 being wound on top of the previously wound coils 64, 60, respectively, and being connected in parallel therewith to the same commutator bars; the coils 74, 70 are respectively terminated in lefthand slots 96, 92 as looped connections. The wires 80, 82 are lastly wound into coils 76, 72 which are respectively wound on top of previously wound coils 66, 62 with the ends 98, 99 of the wires 80, 82 being stuffed into their starting bar slots 91, 95 to place these last coils 76, 72 in parallel respectively with coils 66, 60 physically below them in the armature core. The starting ends 81, 83 and the finishing ends 98, 99 are cut, and then all the slots 90 to 97 are punched radially inwards with an electrically-live electrode punch; the electrode punch creates an electrical discharge to burn off the insulating coating on the wire and physically deform the side walls of the bar slots to clamp the wire ends therein. This provides good mechanical and electrical connection of all the wire ends to the commutator.

Figure 6:
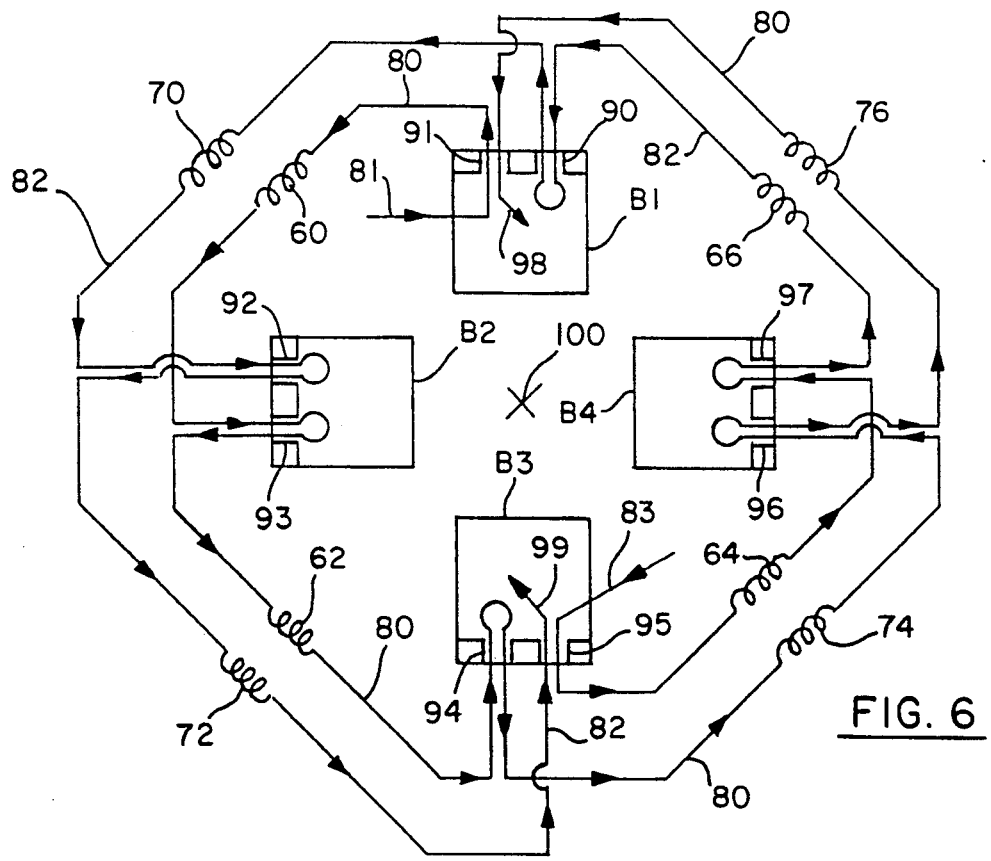
FIG. 6 schematically illustrates the armature of FIG. 5 with the coils and the commutator bars disposed about the axis of rotation of the armature.

FIG. 6 is another representation of the same arrangement as in FIG. 5, but in FIG. 6 the commutator bars B1, B2, B3, B4 and the pairs of parallel coils 60, 70; 62, 72; 64, 74; 66, 76 are spaced around the rotational axis 100 of the armature. FIG. 6 clearly illustrates how the first two coils wound from each wire 80, 82, namely coils 60, 62, 64 and 66, form a complete set of armature coils, and which coils are disposed radially innermost in the armature core; the second two coils wound from the same two wires form a complete set of radially outer armature coils. Thus, each wire 80, 82 first forms two radially inner coils and then two radially outer coils, and each wire finally terminates in the same commutator bar slot that it started in.

It should be noted that in the winding process, both wires change from righthand commutator bar slots to lefthand slots after the armature has been indexed through 180 degrees (in FIG. 6). Then, after the armature has been indexed through a further 180 degrees (in FIG. 6), each of the wires reverts back to the respective righthand slot to terminate in the same slot as it started in. This periodic slot stepping procedure enables the two sets of parallel coils to be continuously and successively wound without removing the armature from the winding machine for mechanical termination of one set of coils before winding the next set.

The commutator bar slots 90 to 97 are cut by milling and dimensioned to cause each of the wires 80, 82 to be a press fit therein. After each wire is drawn over and along each commutator bar slot, it is forced downwards therein (i.e. radially inward towards the armature axis 100) by a tamper blade in a manner well known in the armature winding industry.

The wire is positioned along each commutator bar slot by a wire and positioning arrangement comprising a sleeve carrying a wire guide and oscillatable about the armature axis. This occurs before each indexing of the armature about its axis to prepare to wind the next coil. Arrangements for going this are well known, see for example the arrangements in the previously referenced US patents. To change this wire positioning for righthand and lefthand slots as in the embodiment of FIGS. 5 and 6, the control electronics of the winding machine are programmed to twice change the rotational angle at which the wire is so positioned, for example to retard the angle by 3 degrees at 180 degrees to 177 degrees, and subsequently advance the angle by an extra 3 degrees on the last index movement to bring the wire positioning back to 360 degrees to lay it in its starting slot. Control circuitry for controlling armature winding is disclosed in U.S. Pat. No. 4,163,931 referenced above; it employs micro circuits and programmable, or setable, CMOS electronics. Insertion of two further CMOS transmission gates can accommodate the above two rotational variations of the wire positioning device per 360 degree indexing of the armature.

Figure 7:
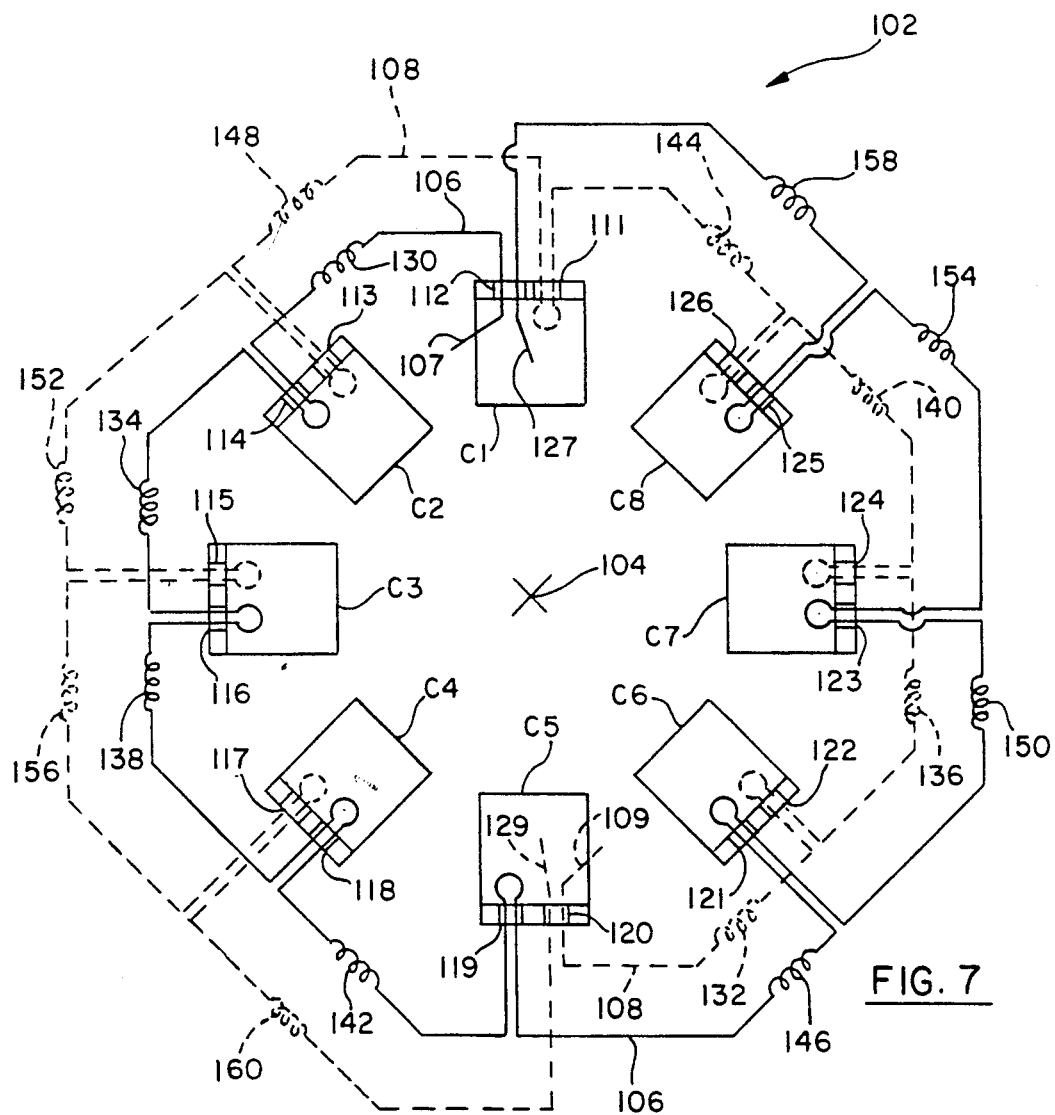
FIG. 7 is a view similar to FIG. 6 but showing the parallel coil winding of the present invention applied to an eight bar commutator, and for ease of understanding showing one coil wire as a continuous line and another coil wire as a broken line.
Figure 8:
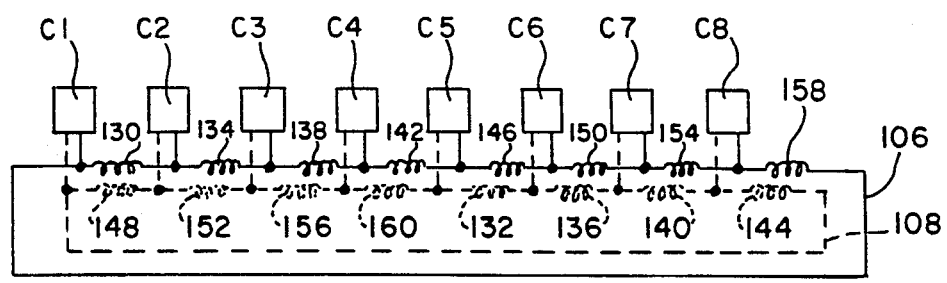
FIG. 8 is a view similar to FIG. 5 but of the embodiment of FIG. 7 and further simplified for clarity.

FIGS. 7 and 8 illustrate a further embodiment of the invention which is similar to that just described with reference to FIGS. 5 and 6. The embodiment of FIGS. 7 and 8 only differs in that the commutator has eight bars and eight pairs of parallel windings are wound in the armature core. Due to the more complex nature of FIGS. 7 and 8, one wire has been shown in full lines and the other wire shown in broken lines to enable each wire to be more easily identified and followed. Also, in FIG. 8 the connection of the wires between adjacent coils to the commutator bars has schematically been shown as a single line for two wire ends; these connections to the commutator bars are in reality the same as shown in more detail in FIG. 7.

FIG. 7 shows schematically the armature 102 having its coil windings and connecting commutator bars disposed about the rotational axis 104 of the armature. The eight symmetrically disposed commutator bars are referenced C1 to C8. Looking radially inwards towards the axis 104, each commutator bar has a pair of adjacent lefthand and righthand slots. Starting counterclockwise from bar C1, the lefthand slots are respectively referenced 111, 113, 115, 117, 119, 121, 123, and 125, while the righthand slots are referenced 112, 114, 116, 118, 120, 122, 124, and 126. The armature is wound by a double flier winder simultaneously from two insulated copper wires 106, 108. The wire 106 is shown as a solid line and the other wire 108 as a broken line for clearer identification. The starting end 107 of the wire 106 is located and tamped in righthand slot 112 of commutator bar C1, and simultaneously the starting end 109 of the wire 108 is similarly located and tamped in the righthand slot 120 of bar C5. Pairs of diametrically opposite windings are then successively wound as the armature core is successively indexed through 45 degree increments. As in the embodiment of FIGS. 5 and 6, each coil is connected between an adjacent pair of commutator bars with the wires remaining continuous and loops formed therein being pressed (by tamping twice) into the selected commutator bar slot—this arrangement is clearly illustrated in FIG. 7. The armature 102 is so indexed through 360 degrees in eight equal increments. The wire end positioning arrangement is programmed to locate each wire in a righthand commutator bar slot for the first three index movements, and then move each wire to a lefthand slot on the forth index at completion of 180 degrees of rotation of the commutator 102 about its axis 104. Thereafter for the next three index movements each wire is located in a lefthand bar slot. On the last index movement, to complete 360 degree indexing of the armature, the wires are reinserted in their original righthand bar slots and the wires cut. As can be seen in FIG. 7, each wire 106, 108 forms four "inner" coils 130, 134, 138, 142 and 132, 136, 140, 144, respectively, and then four "outer" coils 146, 150, 154, 158 and 148, 152, 156, 160, respectively. As explained above with the previous embodiment, the wire end positioning arrangement is programmed to retard its indexing angular position by an appropriate small angle, for example 3 degrees, at the end of half a revolution of indexing of the armature, and then to advance this angle again by the same amount at the completion of the next half revolution of indexing of the armature. This can clearly be understood by, for example, following the solid line wire 106 in FIG. 7. The wire 106, after starting in the righthand slot of bar C1, terminates (by loop connection) in the righthand slots of bars C2, C3 and C4 and in so doing moves past the lefthand slots in these bars. Then, between bars C4 and C5 the wire 106 changes position to terminate in the lefthand slot 119 of bar C5; thereafter the wire 106 continues to terminate in the lefthand slots 121, 123, and 125 of bars C6, C7 and C8, until at bar C1 the wire passes over two slots 126 and 111 to terminate with its end 127 in its starting righthand slot 112. Similarly, the end 129 of the wire 108 finishes in the bar slot 120 tamped on top of the starting end 109. The commutator bars cause the coils wound from the two wires to be electrically in parallel, the parallel pairs of coils being 130,148; 134,152; 138,156; 142,160; 146,132; 150,136; 154,140; and 158,144. As explained With the previous embodiment, the first wound of each of the coils of a parallel pair is located radially innermost in a longitudinal slot in the core of the armature, and the second wound coil of the pair is wound on top of the first wound coil. This arrangement is depicted in the positioning of the coils in FIG. 7.

FIG. 8 is a simplified electrical schematic of the sixteen coils, showing the eight coils of each wire arranged in series with pairs of coils from the two wires connected in parallel via the commutator bars.

It will be appreciated that an armature having any number of commutator bar can be wound according to the invention using the approach of FIGS. 5 to 8. In each case, the armature can be continuously wound without stopping from two wires to form parallel windings. Only after the coil winding has been so completed, need the armature be removed from the coil winding station for completion of termination of the wires at the commutator bars.

According to one of its aspects, the invention can be applied to a single end armature winder with which only a single wire is wound. The armature core would then be indexed through a full revolution while all the radially inner coils were formed. The wire end positioning change from, for example, a righthand bar slot to a lefthand bar slot would then occur followed by a further full revolution of armature indexing to wind the radially outer coils with the end of the wire being terminated, after the two armature indexing revolutions, in its starting slot. In this case, a single wire would form all the pairs of parallel coils with one coil of each pair being wound on top of the other coil of that pair.

It will be appreciated, that when one, two, or even more wires are used to wind armature coils according to the present invention, the small angular increase or decrease in the otherwise normal wire end positioning arrangement for positioning the wire on the commutator bars, occurs at the or each commutator bar at which the or one of the wires starts. This enables continuous winding of parallel coils without complicating the wire end termination procedure.

FIG. 9 illustrates a preferred permanent magnet motor armature 162 according to the invention having sixteen pairs of parallel coils wound in accordance with the procedure described above for the embodiments of FIGS. 5 to 8. The laminated armature core 164 has sixteen coil slots 166 which are longitudinal cavities lined with insulating paper liners. The commutator 168 and core 164 are rigidly mounted on a shaft 170. The commutator has sixteen copper bars 172 separated by insulation 174. A raised flange 176 at the longitudinally inner end of the commutator has pairs of wire termination slots 178 (FIG. 10) milled therein. Each slot 178 contains as a press fit a doubled over wire loop 180 as clearly shown in FIG. 11. Of course, two diametrically opposite slots 178, where the two wires begin and end, will have two cut Wire ends therein, one on top of the other. Each commutator bar slot 178 is partially closed to securely retain the wires therein by a heat and pressure formed, circular indentation 182 midway along its length. When these indentations 182 are formed, the heat employed by electrical discharge is sufficient to burn off the thin insulating coating on the copper wire to ensure good electrical contact between the wire and the commutator bars 172.

FIG. 10 is a section on the line 10—10 of FIG. 9 but modified for simplicity of illustration to the arrangement of the commutator of FIGS. 7 with only eight commutator bars 172. The pair of longitudinal slots 178 in each bar 172 correspond, for example, to the slots pairs 111,112; 113,114; etc. in FIG. 7.

The copper wire employed in the embodiments of FIGS. 5 to 11 for winding the armature coils is 17 gauge. Thus, each pair of parallel coils 60, 70 etc. provides the equivalent power in the electric motor as single wound coils of 14 gauge, for example, a motor with only coils 60, 62, 74 and 76 in FIG. 6 wound in 14 gauge and coils 64, 66, 70 and 72 omitted. However, 17 gauge copper wire is much easier to wind than 14 gauge; in fact, in small dimensioned motors it would be very difficult to wind tight, small coils from 14 gauge wire as the latter would be too stiff. This is particularly so with permanent magnet or universal motors having conservative physical dimensions and of around one horse power or less.

Thus, the present invention enables higher powered small dimensioned permanent magnet and universal motors to be designed and produced. For example, a permanent magnet motor having a stator casing outside diameter of 3.425 inches and a stator casing length of 4.525 inches was made as a one horsepower (approximate) motor using the present invention with sixteen pairs of parallel wound armature coils, each coil having three turns of 17 gauge copper wire. This motor was powered from a 12 volt D.C. source and had an armature with the laminated core 3.125 inches long and of 2.1 inches diameter. Further, the armatures of these motors can be wound with parallel coils in one continuous winding operation without any need to remove the armature from the coil winder between sets of coils for any reason. No special intermediate termination of the coil ends is necessary, all final end termination being performable after all the winding has been completed.

The present invention is particularly useful with battery operated electric motors, for example by 12 volt or 24 volt batteries, where heavy currents need to be drawn (in comparison with mains operated motors) to obtain higher power levels. Such higher power levels are advantageous with cordless devices such as lawnmowers, vacuum cleaners, hedge-trimmers, etc. With such appliances weight is also a consideration, particularly due to the presence of a battery or battery pack; consequently, a more compact motor as can be provided by the present invention is advantageous.

The above described embodiments, of course, are not to be construed as limiting the breadth of the present invention. Modifications, and other alternative constructions, will be apparent which are within the spirit and scope of the invention as defined in the appended claims.

What is claimed is:

1. An armature, comprising:
   an armature core and a commutator supported on a shaft;
   said core having an inner set of coils wound thereon and an outer set of coils wound on top of said inner set;
   half of said inner set and half of said outer set being formed by a first continuous wire, the remaining half of said inner set and the remaining half of said outer set being formed by a second continuous wire;
   said commutator having a plurality of commutator bars each having a pair of wire connecting devices; and
   the first and second wires being connected to said bars between coils of said inner set by only one of the wire connecting devices of each said pair of devices, with said wires being connected to said bars between coils of said outer set by only the other of the wire connecting devices of each said pair of devices.

2. The armature of claim 1, wherein said connecting devices are disposed in a circle about said shaft, each said pair of devices having a leading device and a trailing device in a specific direction of rotation of said shaft.

3. The armature of claim 2, wherein said one of each said pair of devices is a said leading device and said other of each said pair of devices is a said trailing device.

4. The armature of claim 1, wherein each said pair of connecting devices comprises a pair of spaced-apart slots in the respective commutator bar.

5. The armature of claim 1, wherein:
   said core has a plurality of cavities extending parallel to said shaft;
   everyone of the coils of said inner and outer sets of coils being wound through two of said cavities; and
   each cavity having therethrough one of said inner set of coils wound from one of said wires and one of said outer set of coils wound from the other of said wires.

6. An armature, comprising:
   an armature core and a commutator supported on a shaft;
   said core having an inner set of coils wound thereon and an outer set of coils wound on top of said inner set;
   one half of said inner set and one half of said outer set all being formed by a first continuous wire, the remaining half of said inner set and the remaining half of said outer set all being formed by a second continuous wire;
   said commutator having a plurality of spaced-apart commutator bars each having first and second wire connecting devices;
   said first and second wires being connected to said commutator bars between coils of said inner set by only said first wire connecting devices of said pairs of devices;
   said first and second wires being connected to said commutator bars between coils of said outer set by only said second wire connecting devices of said pairs of devices;
   said armature core having a plurality of cavities extending therethrough;
   everyone of the coils of said inner and outer sets of coils being wound through two of said cavities;
   each cavity having therethrough one of said inner set of coils wound from one of said wires and one of said outer set of coils wound from the other of said wires; and
   said one of said inner set of coils and said one of said outer set of coils being connected between a common pair of commutator bars and being so connected in parallel.

7. An electric motor armature, comprising:
   a shaft defining a rotational axis of the armature;
   a laminated core mounted on the shaft and having axially extending coil cavities open radially with respect to the shaft;
   a commutator mounted on the shaft and spaced axially from said core, said commutator having a plurality of axially extending commutator bars spaced apart around said axis;
   each commutator bar having therein, at an end nearest to said core, a pair of parallel, axially extending slots, in a selected direction of rotation of the armature about said axis each said pair of slots comprising a leading slot and a trailing slot;
   a first series of coils formed from a first single wire and disposed in said cavities, each coil of said first series being wound through a different two of said cavities;
   a second series of coils formed from a second single wire and disposed in said cavities, each coil of said second series being wound through a different two of said cavities;
   said first wire having two ends secured one on top of the other in a leading slot of a first commutator bar, and said second wire having two ends secured one on top of the other in a leading slot of a second commutator bar diametrically opposite said first commutator bar with respect to said axis;
   a second half of the coils of said first series being wound on top of a first half of the coils of said second series, and a second half of the coils of said second series being wound on top of a first half of the coils of said first series;
   the first wire being looped over on itself and secured in a respective one of said leading slots between coils of said first half of said first series of coils;
   the second wire being looped over on itself and secured in a respective one of said leading slots between coils of said first half of said second series of coils;

the first wire being looped over on itself and secured in a respective one of said trailing slots between coils of said second half of said first series of coils;

the second wire being looped over on itself and secured in a respective one of said trailing slots between coils of said second half of said second series of coils; and each first series coil and second series coil which are wound one on top of the other being connected between a pair of commutator bars with one of these coils being connected to the leading slots of the pair of commutator bars and the other of these coils being connected to the trailing slots of these commutator bars to connect the coils wound on top of each other in parallel.

8. The armature of claim 7, wherein each said coil is formed by three turns of 17 gauge copper wire.

9. An armature, comprising:

a shaft having an armature core and a commutator mounted thereon;

said commutator having a plurality of bars angularly spaced apart about said shaft;

each commutator bar having first and second wire connection devices angularly spaced apart with respect to said shaft;

a first series of coils formed by a first continuous wire, and a second series of coils formed by a second continuous wire;

each said commutator bar having connected thereto four coils;

said four coils providing two pairs of parallel coils with the two coils of each pair of parallel coils being formed by one of said first series of coils and one of said second series of coils;

said four coils also providing two non-parallel coils connected to the first wire connecting device of the respective commutator bar and two non-parallel coils connected to the second wire connection device of that respective commutator bar; and said first and second continuous wires each having two ends, the two ends of said first wire both being connected to a selected one of said first wire connection devices, the two ends of said second wire both being connected to a selected different one of said first connection devices, and said selected one and different one of said wire connection devices being on different commutator bars.

10. The armature of claim 9, wherein:

said armature core has a plurality of cavities; and each of said cavities has wound therethrough one coil of said first series of coils and one coil of said second series of coils.

11. The armature of claim 10, wherein the two said one coils wound through a respective cavity comprise a top coil and a bottom coil with the top coil being wound on top of the bottom coil.

12. The armature of claim 11, wherein the two said one coils are parallel coils.

13. The armature of claim 12, wherein half the coils of each of said first and second series of coils are top coils, and half the coils of each of said first and second series of coils are bottom coils.

14. The armature of claim 13, wherein a second half of the coils of said first series of coils are wound on top of a first half of the coils of said second series of coils, and a second half of the coils of said second series of coils are wound on top of a first half of the coils of said first series of coils.

15. The armature of claim 9, wherein said first and second wire connection devices of each commutator bar comprise a pair of parallel slots, each slot containing two portions of the same wire with one portion on top of the other portion.

16. An armature, comprising:

a shaft having an armature core and a commutator mounted thereon;

said commutator having a plurality of bars angularly spaced apart about said shaft;

each commutator bar having first and second wire connection divides angularly spaced apart with respect to said shaft;

a first series of coils formed by a first continuous wire, and a second series of coils formed by a second continuous wire;

said coils being wound through said armature core;

each said commutator bar having connected thereto at least four coils;

said four coils comprising two pairs of parallel coils with the two coils of each pair of parallel coils being formed by one coil of said first series of coils and one coil of said second series of coils;

each such pair of parallel coils having the coils thereof connected to different ones of the wire connection devices of a respective one of said commutator bars;

said first and second series of coils each comprising first and second halves, the second half of the coils of each series being wound after the first half of the coils of the respective series;

the second half of the coils of said first series of coils being wound on top of the first half of the coils of said second series of coils; and the second half of the coils of said second series of coils being wound on top of the first half of the coils of said first series of coils.

17. The armature of claim 16, wherein said first and second wires are each formed by a single filament copper wire of 17 gauge.

* * * * *